US009666167B2

(12) United States Patent
Choi

(10) Patent No.: US 9,666,167 B2
(45) Date of Patent: May 30, 2017

(54) APPARATUS AND METHOD FOR DISPLAYING SCREEN

(71) Applicant: Samsung Electronics Co., Ltd., Gyeonggi-do (KR)

(72) Inventor: Young-Berm Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 835 days.

(21) Appl. No.: 13/956,968

(22) Filed: Aug. 1, 2013

(65) Prior Publication Data
US 2014/0063066 A1 Mar. 6, 2014

(30) Foreign Application Priority Data

Aug. 28, 2012 (KR) .................. 10-2012-0094149

(51) Int. Cl.
| | | |
|---|---|---|
| *G09G 5/00* | (2006.01) | |
| *G09G 5/37* | (2006.01) | |
| *G09G 5/397* | (2006.01) | |
| G09G 5/14 | (2006.01) | |
| G09G 5/395 | (2006.01) | |
| G06F 3/14 | (2006.01) | |

(52) U.S. Cl.
CPC ............... *G09G 5/37* (2013.01); *G09G 5/397* (2013.01); *G06F 3/1454* (2013.01); *G09G 5/14* (2013.01); *G09G 5/395* (2013.01); *G09G 2340/10* (2013.01); *G09G 2340/12* (2013.01); *G09G 2340/125* (2013.01)

(58) Field of Classification Search
CPC .... G09G 5/14; G09G 2340/125; G09G 5/395; G09G 2340/10; G09G 2340/12

IPC .............. G09G 5/14,2340/125, 5/395, 2340/10, 2340/12
See application file for complete search history.

(56) References Cited

U.S. PATENT DOCUMENTS

| | | | | |
|---|---|---|---|---|
| 8,462,018 | B1* | 6/2013 | Shepherd | G01C 23/00 340/945 |
| 8,554,897 | B2* | 10/2013 | Kim | H04L 12/2812 709/223 |
| 2007/0023653 | A1* | 2/2007 | Toyoda | G06T 7/0006 250/310 |
| 2007/0077784 | A1* | 4/2007 | Kalayjian | G06F 1/1632 439/61 |
| 2009/0041309 | A1* | 2/2009 | Kim | G06K 9/00604 382/117 |
| 2009/0075697 | A1* | 3/2009 | Wilson | A01G 23/04 455/557 |
| 2010/0125684 | A1* | 5/2010 | Lee | G06F 3/14 710/30 |
| 2010/0198944 | A1* | 8/2010 | Ho | H04L 12/189 709/217 |
| 2010/0259464 | A1* | 10/2010 | Chang | G06F 3/1454 345/2.3 |

(Continued)

*Primary Examiner* — Abderrahim Merouan
(74) *Attorney, Agent, or Firm* — The Farrell Law Firm, P.C.

(57) ABSTRACT

A method and device which provide and manage an image to be displayed on display screens of a portable device and a separate image output device, when the separate image output device is connected to the portable device is provided. Accordingly, an image frame is generated by excluding a specific surface from image frames to be output in the portable device, to the image output device, or constitutes and provides an image frame including a surface to be displayed on the image output device, to the image output device.

18 Claims, 15 Drawing Sheets

(56) References Cited

U.S. PATENT DOCUMENTS

| | | | | |
|---|---|---|---|---|
| 2011/0122154 A1* | 5/2011 | Kawai | ............... | G11B 27/034 345/629 |
| 2011/0141319 A1* | 6/2011 | Watazawa | ......... | H04N 5/23219 348/240.2 |
| 2011/0143769 A1* | 6/2011 | Jones | ................ | G06F 1/1624 455/456.1 |
| 2011/0225330 A1* | 9/2011 | Lavian | ............. | H04M 1/72527 710/63 |
| 2012/0040719 A1* | 2/2012 | Lee | .................. | G06F 1/1626 455/557 |
| 2012/0056899 A1* | 3/2012 | Stroila | ................ | G01C 21/32 345/634 |
| 2012/0191832 A1* | 7/2012 | Kim | ................. | H04L 12/2812 709/223 |
| 2012/0206372 A1* | 8/2012 | Mundt | .............. | G06F 3/1454 345/173 |
| 2013/0016281 A1* | 1/2013 | Sato | ................ | H04N 1/00448 348/468 |
| 2013/0024812 A1* | 1/2013 | Reeves | .............. | G06F 3/1423 715/810 |
| 2013/0321309 A1* | 12/2013 | Tokutake | ............. | G06F 3/0488 345/173 |

\* cited by examiner

APPARATUS AND METHOD FOR DISPLAYING SCREEN

PRIORITY

This application claims priority under 35 U.S.C. §119(a) to Korean Application Serial No. 10-2012-0094149, which was filed in the Korean Intellectual Property Office on Aug. 28, 2012, the contents of which are incorporated herein by reference.

BACKGROUND OF THE INVENTION

1. Field of the Invention

The present invention relates generally to a method of displaying a screen of a portable device, and more particularly, to an apparatus and method for effectively displaying information on each screen of a portable device and an image output unit, when a separate image output unit is connected to the portable device.

2. Description of the Related Art

Portable devices are now able to provide various pieces of information to a user through a separate digital device connected to the portable device. For example, portable device such as a smart phone may be connected to an image output unit such as an Internet Protocol (IP) television through a wired cable, a docking station, or a short-range wireless communication, for example, so as to display various images which are provided through the smart phone on the IP television. The images are displayed on a screen wider than that of the portable device, thereby improving user convenience and providing higher service quality.

The portable device may capture and store a screen that is displayed on a display unit. As illustrated in FIG. 1, for example, a smart phone 10 can capture entire images displayed on a current screen according to a screen capturing instruction, and store a captured file.

However, as illustrated in FIG. 2, if a tablet Personal Computer (PC) 20 is connected to an IP television 30 through a cable, a screen displayed on the tablet PC 20 may be identically displayed on the IP television 30. Likewise, as illustrated in FIG. 3, when the smart phone 10 is connected to the IP television 30 through a docking station 40, a screen displayed on the smart phone 10 may be identically displayed on the IP television 30.

When screen capture is performed by using the conventional portable device, as illustrated in FIG. 1, a screen to be displayed on the portable device is stored as an image file. For example, with a smart phone 10 in which various indicators relating to an execution image and a mobile communication are displayed on a screen as a specific application is activated, there is a problem in that the full screen including the various indicators is captured and stored instead of only the application execution image desired by the user.

When an image output unit is connected to the portable device, only a screen identical to that of the portable device is displayed on the image output unit. The image output unit cannot display a different screen from that of the portable device.

When the image output unit is connected to the portable device through the docking station 40, the portable device can display an image on an external image output unit in a displaying direction identical to that of the portable device mounted on the docking station 40. That is, as illustrated in FIG. 3, when the smart phone 10 is mounted on the docking station 40 in a vertical direction and is connected to the IP television 30, the IP television 30 outputs an image in the same vertical direction as the smart phone 10 displays the image even if the IP television is a landscape-type device. As described above, if the IP television 30 displayed the image in a horizontal direction, the user could recognize the image more naturally.

SUMMARY OF THE INVENTION

The present invention has been made to address at least the problems an disadvantages described above, and to provide at least the advantages described below. Accordingly, an aspect of the present invention is to provide an apparatus and a method for constituting an image frame so that an image displayed on a portable device is different from an image displayed on an external image output device.

Another aspect of the present invention is to provide an apparatus and a method for storing only a piece of image data in a screen displayed on the portable device.

In accordance with an aspect of the present invention, a method of displaying a screen on a portable device having at least one display unit includes detecting that an event of changing a screen is generated, determining one or more surfaces which display data according to the presence or the absence of a connection of the portable device with an external image output device, allocating a surface property which indicates which frame of an internal output image frame and an external output image frame a corresponding surface constitutes, to each of the surfaces, generating one or more surfaces, combining one or more surfaces according to the surface property, resulting in a generation of the internal output image frame and the external output image frame, and displaying the internal output image frame on the display unit while transmitting the external output image frame to the external image output device.

In accordance with another aspect of the present invention, a portable device includes at least one display unit, a controller for detecting that a screen-changing event is generated, determining one or more surfaces which display data according to the presence or the absence of a connection of the portable device with the external image output device, and allocating the surface property which indicates which frames of the internal output image frames and the external image output frames the corresponding surface constitutes, to each of the surfaces, and an image-processing unit for generating one or more surfaces according to the surface property so as to generate the internal output image frame and the external image output frames and displaying the internal output image frame on the display unit while transmitting the external output image frame to the external image output device.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
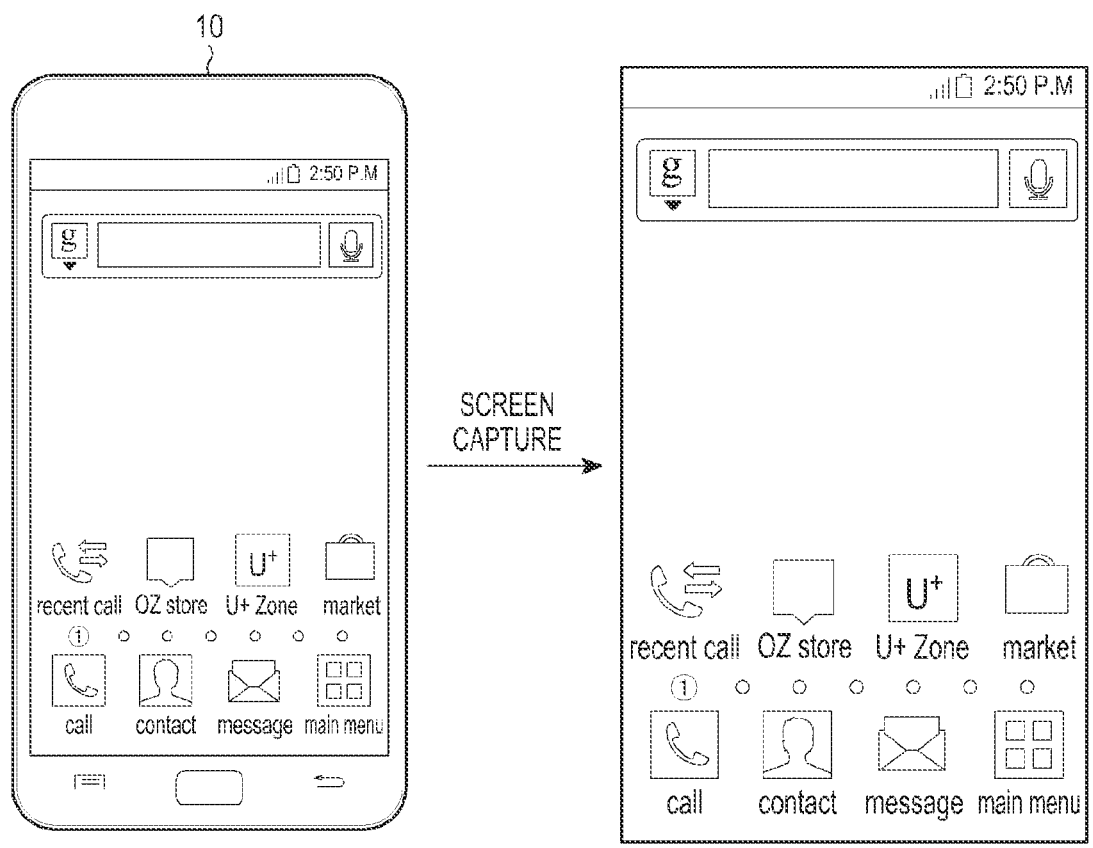
FIGS. 1 to 3 illustrate an example of a conventional connection of a portable device and an image output device.
Figure 2:
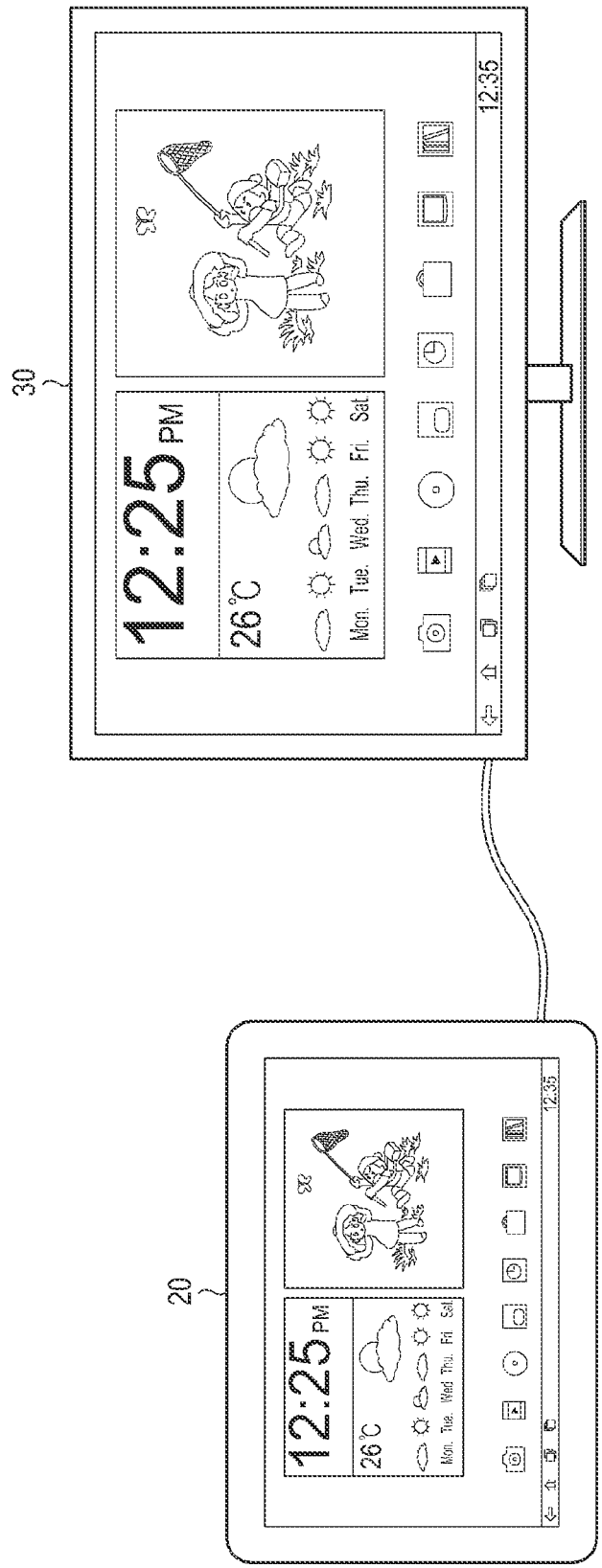
Figure 3:
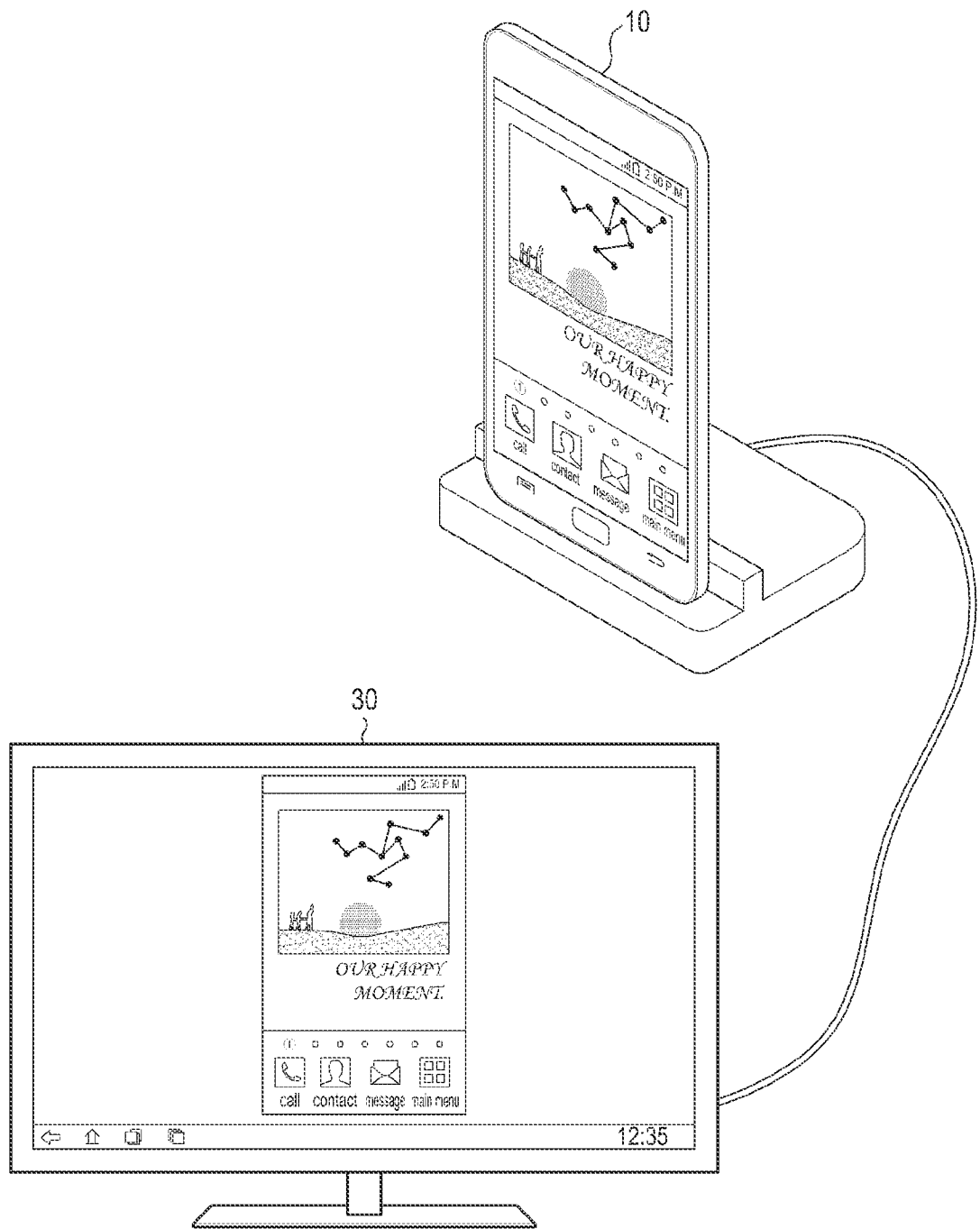

Hereinafter, embodiments of the present invention will be described in detail with reference to the accompanying drawings. It should be noted that the same reference numerals and symbols denote identical structural elements although the structural elements are depicted in different drawings. Descriptions of well-known functions and constructions may be omitted for the sake of clarity and conciseness.

The present invention may have various forms and embodiments, which are not intended to limit the scope of the present invention.

Terms including ordinal numerals such as "first" and "second" can be used to describe various structural elements, but the structural elements are not limited by these terms. The terms are used only to distinguish one structural element from another structural element. For example, without departing from the scope of the present invention, a first structural element may be named a second structural element. Similarly, the second structural element also may be named the first structural element. The term "and/or" includes combinations of a plurality of related items or a certain item among the plurality of related items.

The terms are used herein to describe a specific embodiment, and are not intended to limit the present invention. A singular expression includes a plural expression unless they are contextually different. In the description, it should be understood that the terms "include" or "have" indicate existence of a feature, a number, a step, an operation, a structural element, parts, or a combination thereof, and do not previously exclude the existence or probability of addition of one or more other features, numbers, steps, operations, structural elements, parts, or combinations thereof.

The portable device may classify various pieces of information or data and designate surfaces (or layers) to illustrate the classified information or data, in order to display the various pieces of information or data on a screen according to a proper reference. After drawing corresponding information or data on the respective designated surfaces, the surfaces are combined to generate an image frame and output the image frame to the display unit. One image frame is constituted by at least one surface. The respective surfaces have the same or different size, position as/from one another.

Figure 4:
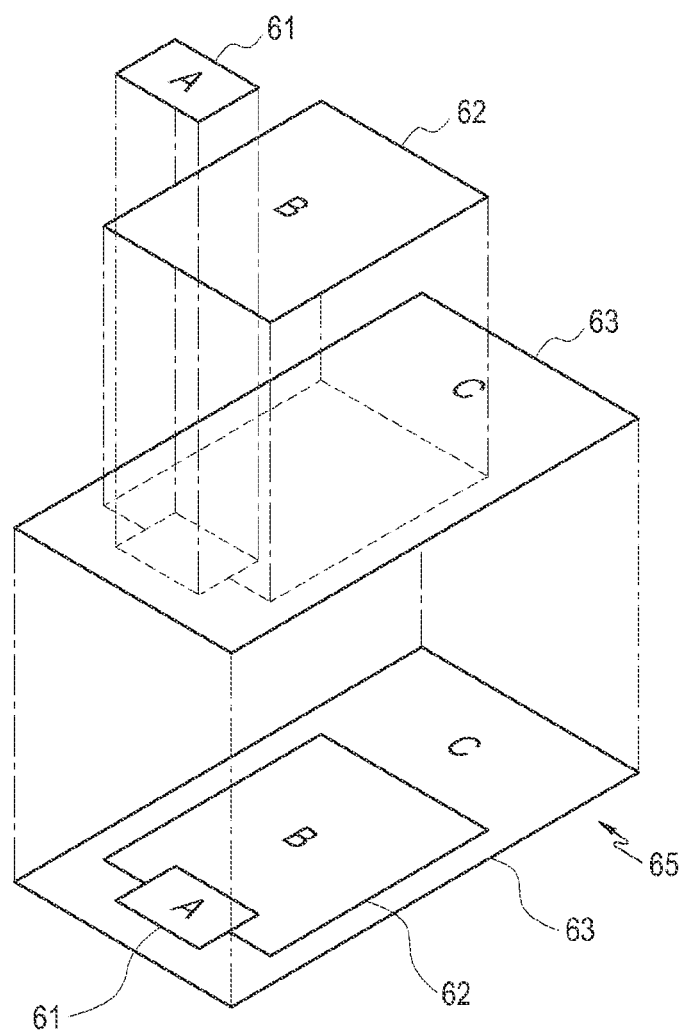
FIG. 4 illustrates an example of a process of generating an image frame.

FIG. 4 illustrates an example of the image frame that is finally generated by combining a surface A 61, a surface B 62, and a surface C 63. Different data are depicted in the respective surfaces, and it is assumed that the surface A 61 has the highest visual priority while the surface C 63 has the lowest visual priority. As the plurality of surfaces is combined in a layered structure according to the visual priority, data of the surface having the highest visual priority is displayed in an overlapping portion among the respective surfaces.

The present invention aims to effectively provide and manage an image to be displayed on display screens of the portable device and a separate image output device, when the separate image output device is connected to the portable device. Accordingly, the present invention provides an image frame, which is generated by excluding a specific surface from image frames to be output in the portable device, to the image output device, or constitutes and provides an image frame including a surface to be displayed on the image output device, to the image output device.

In order to differently constitute an internal frame output by the portable device and an external output frame transmitted to the external image output device, the present invention defines a new surface property. The surface property is allocated to each surface, which shows which frame a corresponding surface has to constitute among the internal output frame and the external output frame. In other words, the present invention combines suitable surfaces to constitute the internal output frame and the external output frame according to the surface property and the presence or absence of the connection of the external image output device.

It is possible to capture and store the image frame in which a partial surface is excluded from image frames to be displayed on the screen of the portable device, or the image frame displayed on the external image output device, by using the surface property.

Figure 5:
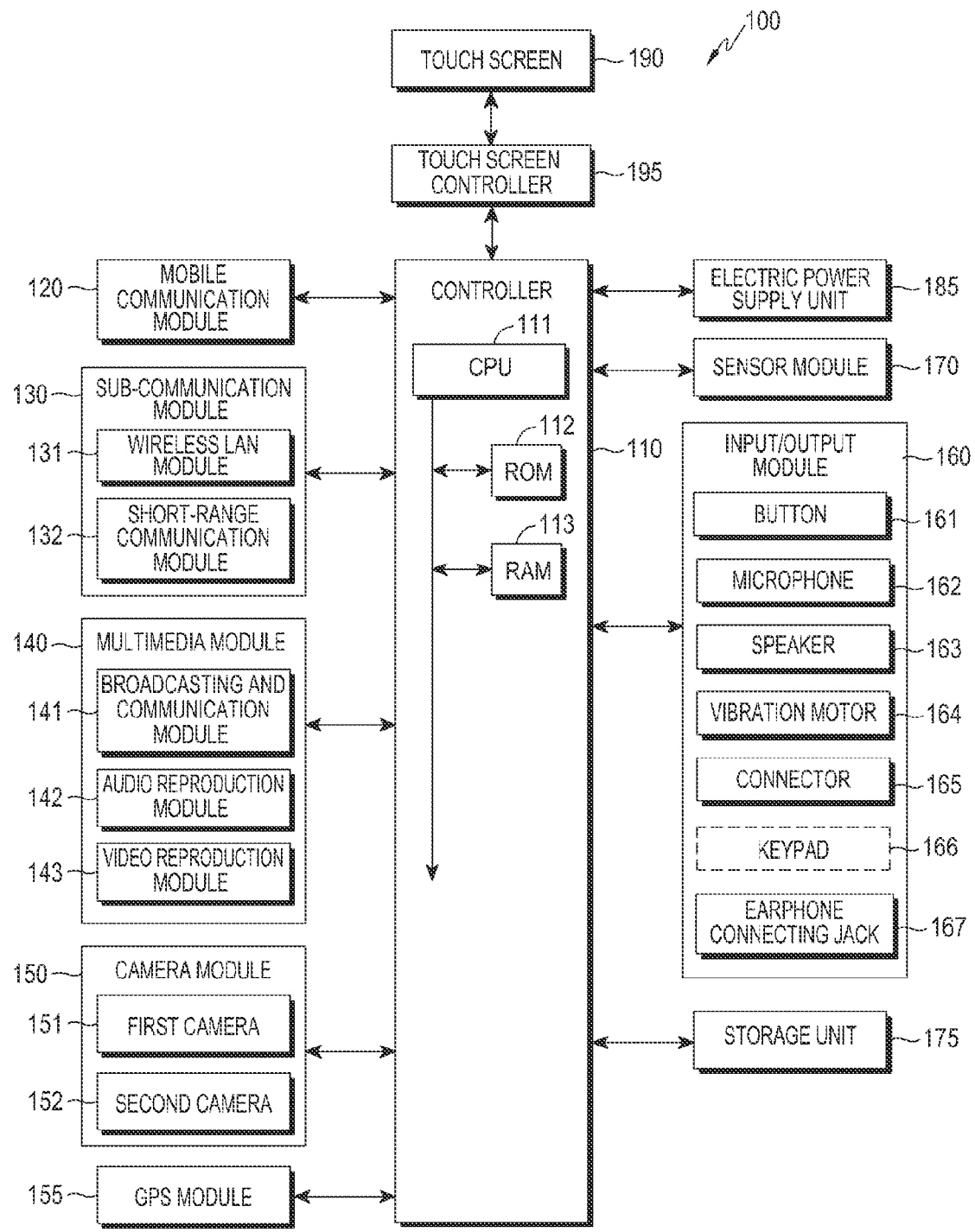
FIG. 5 illustrates a structure of a portable device according to an embodiment of the present invention.

FIG. 5 illustrates a structure of a portable device according to an embodiment of the present invention.

Referring to FIG. 5, the portable device 100 can be connected to an external device (not shown) by using an external device connection unit such as a sub-communication module 130, a connector 165, and an earphone-connecting jack 167. The "external device" may include various devices such as an earphone, an external speaker, a Universal Serial Bus (USB) memory, a charger, a cradle, a docking station, a Digital Multimedia Broadcasting (DMB) antenna, a portable payment unit, a health-care device such as a blood-sugar meter, a game player, and a navigation unit for a vehicle. The "external device" may also include a short-range communication unit such as a Bluetooth® communication module or a Near Field Communication (NFC) module which are connected by a short-range communication to the portable device 100, a Wi-Fi direct communication device, and a wireless Access Point (AP). The external device may further include another device, an image output device, and a server. The image output device corresponds to a device including a display unit on which an image is displayed, such as a portable phone, a smart phone, a tablet PC, a desktop PC, and a television.

Referring to FIG. 5, the portable device 100 includes a display (e.g. touch screen) unit 190 and a display (e.g. touch screen) controller 195. The portable device 100 also includes a controller 110, a mobile communication module 120, a sub-communication module 130, a multimedia module 140, a camera module 150, a GPS module 155, an input/output module 160, a sensor module 170, a storage unit 175, an image-processing unit 180, and an electric power supply unit 185.

The sub-communication module 130 includes at least one of a wireless Local Area Network (LAN) module 131 and a short-range communication module 132, and the multimedia module 140 includes at least one of a broadcasting and communication module 141, an audio reproduction module 142, and a video reproduction module 143. The camera module 150 includes at least one of a first camera 151 and a second camera 152, and the input/output module 160 includes at least one of buttons 161, a microphone 162, a speaker 163, a vibration motor 164, a connector 165, a keypad 166, and an earphone-connecting jack 167. Hereinafter, the display unit 190 and the display controller 195, which respectively include a touch screen and a touch screen controller will be described as an example.

The controller 110 includes a Central Processing Unit (CPU) 111, a Read-Only Memory (ROM) 112 in which a control program for a control of the portable device 100 is stored, and a Random Access Memory (RAM) 113 which stores signals or data input from an exterior of the portable device 100, or is used as a storage region for operations performed by the portable device 100. The CPU 111 may include a single core, a dual core, a triple core, or a quad core. The CPU 111, the ROM 112 and the RAM 113 are connected to one another through an internal bus.

The controller 110 controls the mobile communication module 120, the sub-communication module 130, the multimedia module 140, the camera module 150, the GPS module 155, the input/output module 160, the sensor module 170, the storage unit 175, the electric power supply unit 185, the touch screen 190 and the touch screen controller 195.

The mobile communication module 120 connects the external device to the portable device 100 by using one or more antennas (not shown) under a control of the controller 110. The mobile communication module 120 transmits and receives radio signals for a voice call, a video call, a Short Message Service (SMS), or a Multimedia Message Service (MMS) to/from a portable phone (not shown), a smart phone (not shown), a tablet PC, or other devices (not shown) which have telephone numbers input into the portable device 100.

The sub-communication module 130 includes one or both of the wireless LAN module 131 and the short-range communication module 132.

The wireless LAN module 131 can be connected to the Internet at a location in which a wireless AP (not shown) is installed, under a control of the controller 110. The wireless LAN module 131 supports the wireless LAN provision, i.e. IEEE802.11x of the Institute of American Electrical and Electronics Engineers (IEEE). The short-range communication module 132 wirelessly performs short-range communication between the portable device 100 and the image display unit (not shown), under a control of the controller 110. The short-range communication scheme may include, for example, a Bluetooth® communication scheme, an Infrared Data Association (IrDA) scheme, a Wi-Fi Direct communication scheme, or a Near Field Communication (NFC) scheme.

The portable device 100 includes one or more of the mobile communication module 120, the wireless LAN module 131 and the short-range communication module 132, based on performance.

The multimedia module 140 includes the broadcasting and communication module 141, the audio reproduction module 142, or the video reproduction module 143. The broadcasting and communication module 141, under a control of the controller 110 receives broadcasting signals, i.e. TeleVision (TV) broadcasting signals, radio broadcasting signals, and data broadcasting signals, and broadcasting additional information, i.e. Electronic Program Guide (EPG) and Electronic Service Guide (ESG), which are transmitted from broadcasting stations, through broadcasting and communication antennas (not shown). The audio reproduction module 142 reproduces digital audio files, i.e. files having an extension of mp3, wma, ogg, or wav, which are stored or received, under a control of the controller 110. The video reproduction module 143 reproduces digital video files, i.e. files having an extension of mpeg, mpg, mp4, avi, mov, or mkv, which are stored or received, under a control of the controller 110. The video reproduction module 143 can reproduce the digital audio files.

The multimedia module 140 may include the audio reproduction module 142 and the video reproduction module 143, except for the broadcasting and communication module 141. The audio reproduction module 142 or the video reproduction module 143 of the multimedia module 140 may be included in the controller 110.

The camera module 150 includes at least one of the first camera 151 and the second camera 152 to photograph a stationary image or a video under a control of the controller 110. The first camera 151 or the second camera 152 may include an auxiliary light source, i.e. a flash (not shown), to provide an amount of light necessary for photography. The first camera 151 may be disposed on a front surface of the portable device 100, and the second camera 152 may be arranged on a rear surface of the portable device 100. Alternatively, the first and second camera 151 and 152 may be adjacently arranged at a distance of 1 cm to 8 cm, so as to photograph a three-dimensional stationary image or a three-dimensional video.

The GPS module 155 receives electric waves from a plurality of Global Positioning System (GPS) satellites (not shown) in Earth's orbit, and calculates a position of the portable device 100 by using time of arrival from the GPS satellites (not shown) to the portable device 100.

The input/output module 160 includes at least one of plural buttons 161, a microphone 162, a speaker 162, a vibration motor 164, a connector 165, a keypad 166, and an earphone-connecting jack 167.

The buttons 161 are disposed on a front surface, a side surface or a rear surface of a housing of the portable device 100, and include an electric power/lock button (not shown), a volume control button (not shown), a menu button, a home button, a back button, and a search button.

The microphone 162 receives an input of voice or sound to generate electric signals under a control of the controller 110.

The speaker 163 outputs sounds, which correspond to various signals, i.e. wireless signals, broadcasting signals, digital audio files, digital video files, and photographing, of the mobile communication module 120, the sub-communication module 130, the multimedia module 140 or the camera module 150, to the exterior of the portable device 100, under a control of the controller 110. The speaker 163 output sounds, i.e. a button operation sound, or a ringtone corresponding to a voice call, corresponding to functions that the portable device 100 performs. One or more speakers 163 are arranged on a suitable position or positions of the housing of the portable device 100.

The vibration motor 164 converts electric signals into mechanical vibrations under a control of the controller 110. For example, the portable device 100, which remains in a vibration mode, operates the vibration motor 164 when receiving a voice call from another device (not shown). One or more vibration motors 164 are arranged in the housing of the portable device 100. The vibration motor 164 operates in response to a touch operation of a user who touches the touch screen 190, and a continuous movement of a touch on the touch screen 190.

The connector 165 is used as an interface to connect the portable terminal 100 to the external device (not shown) or electric power source (not shown). The portable device 100 transmits data which is stored in the storage unit 175 of the portable device 100, to the external device (not shown) through a wired cable connected to the connector 165, or receives data from the external device (not shown), under a control of the controller 110. The external device may be the dock station, and the data may be input signals transmitted from an external input device, for example a mouse or a keyboard. The portable device 100 is supplied with electric power from the electric power source through the wired cable connected to the connector 165, or can charge a battery (not shown) by using the electric power source.

The keypad 166 receives a key input of a user in order to control the portable device 100. The keypad 166 includes a physical keypad (not shown) arranged on the portable device 100, or a virtual keypad displayed on the touch screen 190. The physical keypad (not shown) arranged on the portable device 100 can be excluded according to the performance or structure of the portable device 100.

An earphone (not shown) is inserted in the earphone-connecting jack 167 and connected to the portable device 100.

The sensor module 170 includes at least one sensor for detecting a status of the portable device 100. For example, the sensor module 170 may include a proximity sensor (not shown) for detecting whether a user comes close to the portable device 100, an illuminance sensor (not shown) for detecting an amount of light surrounding the portable device 100, a motion sensor (not shown) for detecting operations of the portable device 100, i.e. a rotation of the portable device 100, and an acceleration or a vibration applied to the portable device, a geo-magnetic sensor (not shown) for detecting a point of the compass by using a magnetic field of the Earth, a gravity sensor (not shown) for detecting an action direction of the gravity, and an altimeter (not shown) for detecting altitude by measuring an atmospheric pressure. At least one sensor detects a status of the portable device, and generates signals corresponding to the detection so as to transmit the signals to the controller 110. Sensors of the sensor module 170 may be added or excluded according to the performance of the portable device 100.

The storage unit 175 stores signals or data that are input/output in correspondence to operations of the mobile communication module 120, the sub-communication module 130, the multimedia module 140, the camera module 150, the GPS module 155, the input/output module 160, the sensor module 170, and the touch screen 190 under a control of the controller 110. The storage unit 175 stores a control program and an application for controlling the portable device 100 or the controller 110.

The term "storage unit" refers to the storage unit 175, the ROM 112 and the RAM 113 in the controller 110, or a memory card (not shown), i.e. a Secure Digital (SD) card, and a memory stick, inserted in the portable device 100. The storage unit may include a non-volatile memory, a volatile memory, a Hard Disk Drive (HDD), and a Solid State Drive (SSD).

The electric power supply unit 185 supplies one or more batteries (not shown), which are disposed in the housing of the portable device 100, with electric power under a control of the controller 110. One or more batteries (not shown) supply the portable device 100 with electric power. The electric power supply unit 185 supplies electric power to the portable device 100 from the external electric power source (not shown) through the wired cable connected to the connector 165. The power supply unit 185 supplies the portable device 100 with electric power wirelessly input from the external electric power source by using a wireless charging technique.

The touch screen 190 provides a user with a User Interface (UI) corresponding to various services, i.e. a voice call, a data transmission, broadcasting, and photographing The touch screen 190 transmits analog signals, which correspond to at least one touch input into the UI, to the touch screen controller 195. The touch screen 190 receives at least one touch caused by a body of the user, i.e. fingers including a thumb, or an input means capable of touching, i.e. a stylus pen. The touch screen 190 receives a continuous movement of one touch among the touches. The touch screen 190 transmits analog signals, which correspond to the continuous movement of the input touch, to the touch screen controller 195.

In the present invention, the touch is not limited to a contact with the body of the user or the input means capable of touching, and may include non-contact. A distance of the non-contact detected by the touch screen 190 can be changed according to the performance or the structure of the portable device 100.

The touch screen 190 may be implemented by a resistive type, a capacitive type, an infrared type, or an ultrasonic wave type of touch screen.

The touch screen controller 195 converts analog signals received from the touch screen 190 into digital signals, i.e. X and Y coordinates, and transmits the digital signals to the controller 110. The controller 110 can control the touch screen 190 by using the digital signals received from the touch screen controller 195. For example, the controller 110 allows a short-cut icon (not shown), which is displayed on the touch screen 190, to be selected, or executes the short-cut icon, in response to the touch screen 190. The touch screen controller 195 may be included in the controller 110.

The image-processing unit 180 generates output image frames under a control of the controller 110. The output image frames can be classified into internal output frames and external output frames. The internal output frames refer to image frames output from the portable device 100, and the external output frames refer to image frames that are transmitted to and output from a separate image output device connected to the portable device 100.

The controller 110 identifies data to be displayed on a screen in correspondence to a screen-changing event when the screen-changing event is generated, and whether the separate image output device is connected to the portable device 100. Then, the controller 110 determines a necessary surface and transmits the data to the image-processing unit 180.

The screen-changing event causes a change of information to be provided through the screen of the portable device. For example, the screen-changing event may be generated by an input of a user input through a user input device such as the button 161 or the touch screen 190, a request of an execution of a new application, new information generated in an application execution process, or information received through the mobile communication module 120 or the sub-communication module 130. The screen-changing event may be generated when the connection of the external image output device is detected and the image frames are transmitted to the external image output device.

The controller 110 sets the property and visual priority of each surface when the necessary surfaces are determined. The surface property is to illustrate which frame of the internal output and the external output frames a corresponding surface has to constitute. The surface property includes an internal property, a general property, and an external property. Hereinafter, a surface having the internal property is referred to as an internal surface, a surface having the general property is referred to as a general property, and a surface having the external property is referred to as an external surface.

The visual priority refers to a layer combination order of the surfaces when the surfaces are combined in a manner of a layer structure to generate one image frame, and a corresponding surface having a higher priority is located on an upper portion. The visual priority indicates that the priority in visibility is higher as the priority is higher. That is, if there is present an overlapping portion between the surfaces when the plural surfaces are combined, it is displayed that an overlapping portion of a surface having a lower priority is intended to be covered with an overlapping portion of a surface having a higher priority. The controller 110 may designate the visual priority for each surface in a process of determining a necessary surface, and may set the visual priority to a corresponding surface after all necessary surfaces are generated.

The controller 110 transmits the necessary surface, the surface property of each surface, the visual priority, and data to be displayed on each surface, to the image-processing unit 180.

The image-processing unit 180 generates a corresponding surface under a control of the controller 110. The image-processing unit 180 combines the surfaces so as to generate the external output frames or the internal output frames, and transmits the external output frames or the internal output frames to corresponding devices. If a user requests the image-processing unit 180 to capture and store the external output frames, the image process unit 180 stores the external output frames in the storage unit 175.

Figure 6:
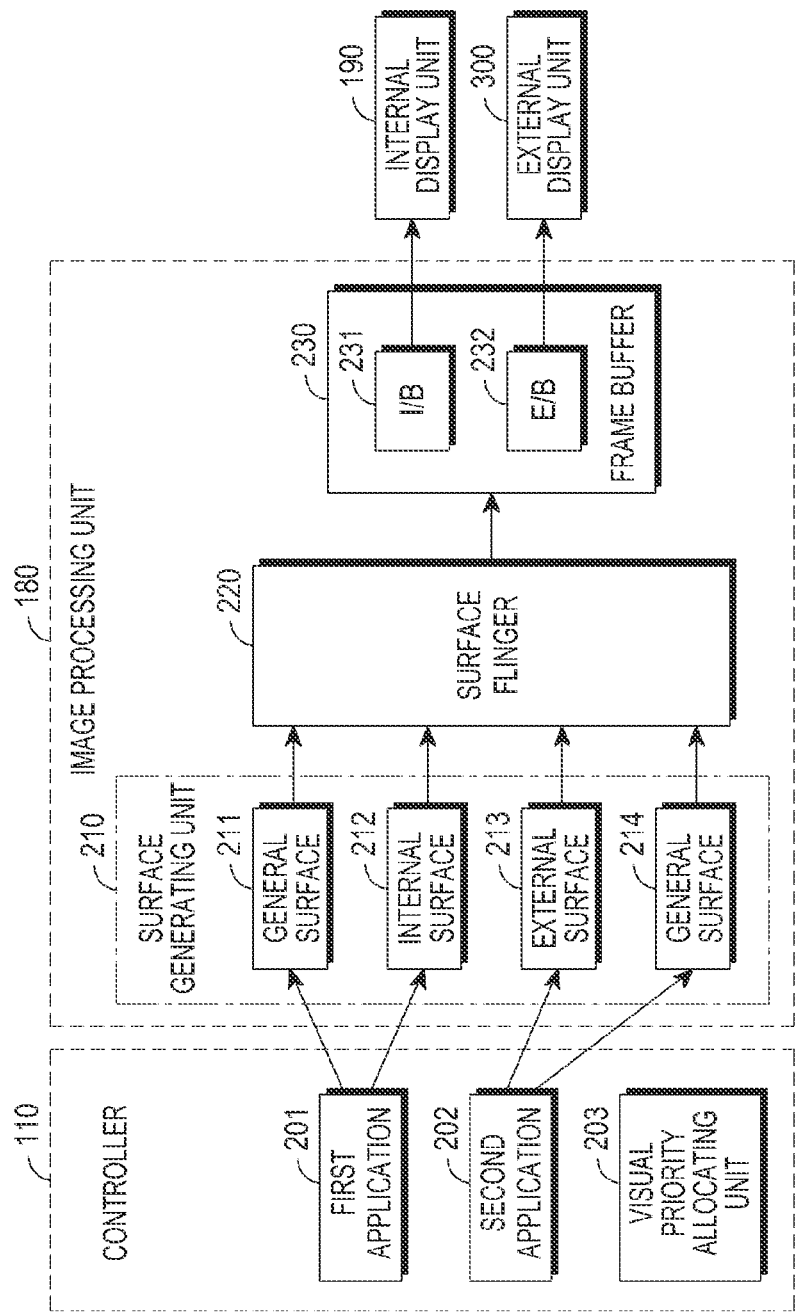
FIG. 6 illustrates a structure of a portable device according to an embodiment of the present invention.

FIG. 6 illustrates the structure of the image-processing unit 180 according to an embodiment of the present invention. Referring to FIG. 6, the image-processing unit 180 includes a surface-generating unit 210, a surface flinger 220, and a frame buffer 230.

The controller 110 can simultaneously execute a plurality of applications. Therefore, it is assumed that two applications 201 and 202 are executed in the embodiment of FIG. 5. Also, it is assumed that the controller 110 includes a visual priority-allocating unit 203, which allocates the visual priority. The controller 110 determines the surfaces 211, 212, 213 and 214 for displaying data, and the surface property of the first and second applications 201 and 202, and designates the visual priority through the visual priority-allocating unit 203. The controller 110 transmits the surfaces and the surface property to the image-processing unit 180.

The surface-generating unit 210 generates the surfaces under a control of the controller 110, and transmits the surfaces to the surface flinger 220. In an example of FIG. 6, the surface-generating unit 210 generates a general surface 211 and an internal surface 212 for displaying the first application 201, and an external surface 213 and the general surface 214 of the second application 202.

The surface flinger 220 generates and stores the internal output frames or the external output frames to the frame buffer 230 according to the presence or the absence of a connection of a separate image output device to the portable device 100, and the surface property and the visual priority of each surface.

Rules for combining the respective surfaces to generate the internal output frame or the external output frame according to the surface property of each surface when the image output device is connected to the portable device is as follows.

(1) When only the general surface is present, image frames in which all general surfaces are combined are used as the internal output frames and the external output frames.

(2) When only the general surface and the internal surface are present, the internal output surfaces are generated by combining the general surfaces and the internal surfaces, and external output frames are generated by combining the general surfaces except for the internal surfaces.

(3) When only the general surface and the external surface are present, the internal output frames are generated by combining only the general surfaces, and the external output frames are generated by combining only the external surfaces.

(4) When the general surface, the internal surface and the external surface are present, the internal output frames are generated by combining only the general surfaces and the internal surfaces, and the external output frames are generated by combining only the external surfaces.

The frame buffer 230 may include an internal frame buffer (I/B) 231 in which the internal output frames are stored, and an external frame buffer (E/B) 232 in which the external output frames are stored. The internal output frames which are stored in the internal frame buffer 231 are output on an internal display unit 190 such as an LCD display unit which is provided to the portable device 100, and the external output frames which are stored in the external frame buffer 23 are output on an external image output device 300 connected to the portable device 100.

Figure 7:
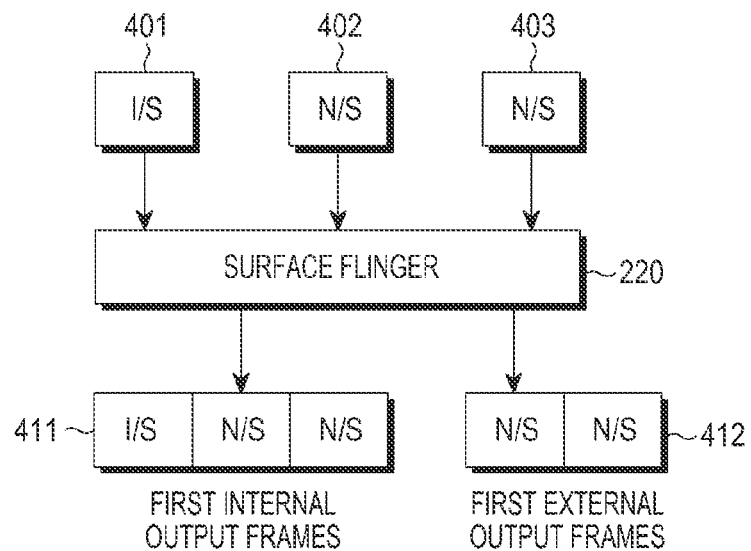
FIGS. 7 and 8 illustrate a process of generating an internal output frame and an external output frame according to the embodiment of the present invention.
Figure 8:
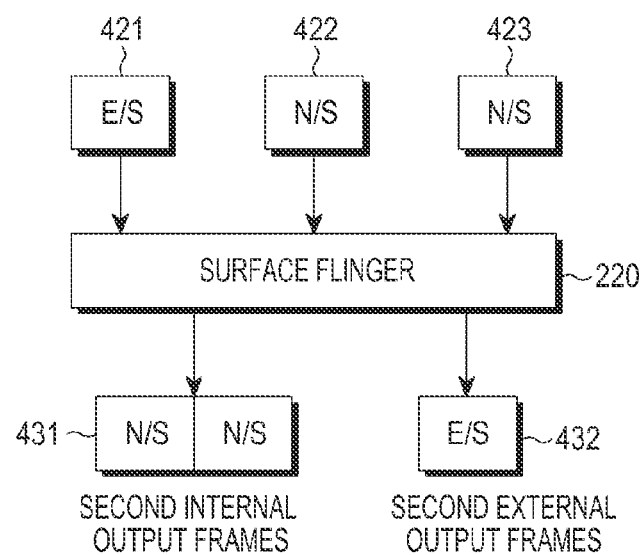

FIGS. 7 and 8 illustrate an example in which the surface flinger 220 of the image-processing unit 180 constructed as described above combines the surfaces so as to generate the image frames, where the external image output device is connected to the portable device 100. FIG. 7 illustrates an example in which the surface flinger 220 combines one internal surface 401 and two general surfaces 402 and 403, and FIG. 8 illustrates an example in which the surface flinger 220 combines one external surface 421 and two general surfaces 422 and 423.

Referring to FIG. 7, the surface flinger 220 combines the internal surface 401 and the two general surfaces 402 and 403 so as to generate first internal output frames 411, and combines only the two general surfaces 402 and 403 so as to generate first external output frames 412.

Referring to FIG. 8, the surface flinger 220 combines two general surfaces 422 and 423 so as to generate second internal output frames 431, and also generates second external output frames 432 by using only the external surface 421.

Figure 9:
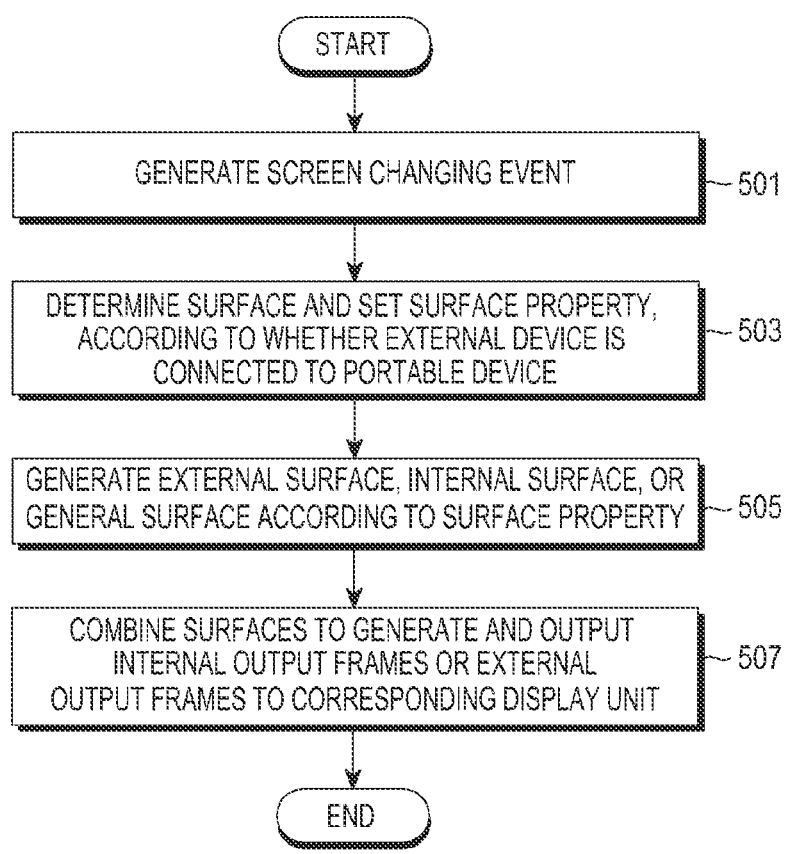
FIGS. 9 to 12, and 14 illustrate an operation process of the portable device according to the embodiment of the present invention.

FIG. 9 illustrates the process of generating the output image frames according to the embodiment of the present invention. Referring to FIG. 9, the controller 110 of the portable device 100 detects a generation of a screen-changing event in step 501, and then proceeds to step 503. In step 503, the controller 110 determines a surface necessary for a construction of the image frames according to the presence or the absence of a connection of the external image output device, and sets the surface property of each surface.

The necessary surface is determined according to a type of data or information to be displayed on a screen, and the presence or the absence of a connection of the external image output device. That is, if the external image output device is connected to the portable device 100 and the portable device 100 has to output the image frames to the external image output device, the surface having the internal property, the general property, or the external property will be required.

If the external image output device is not connected to the portable device 100, the surface having the external property is unnecessary. However, the internal property can be used to display data to be excluded when a screen is captured and stored.

Although the portable device is connected to the external image output device, the necessary property of the internal, the general, and the external properties may be changed according to which screen is displayed on the external image output device. In other words, a surface property to be used can be determined according to the presence or the absence of the data (or information), which is transmitted to only the external image output device, or is displayed on only the display unit of the portable device 100, among the data (or information) to be displayed on a screen. A reference on which one of the internal display unit and the external output device the data or information to be provided through the screen must be displayed is previously stored in the storage unit 175.

In step 505, the image-processing unit 180 of the portable device 100 generates external, internal, or general surfaces. In step 507, the image-processing unit 180 suitably combines each surface so as to generate and output internal output frames or external output frames to a corresponding display unit.

Figure 10:
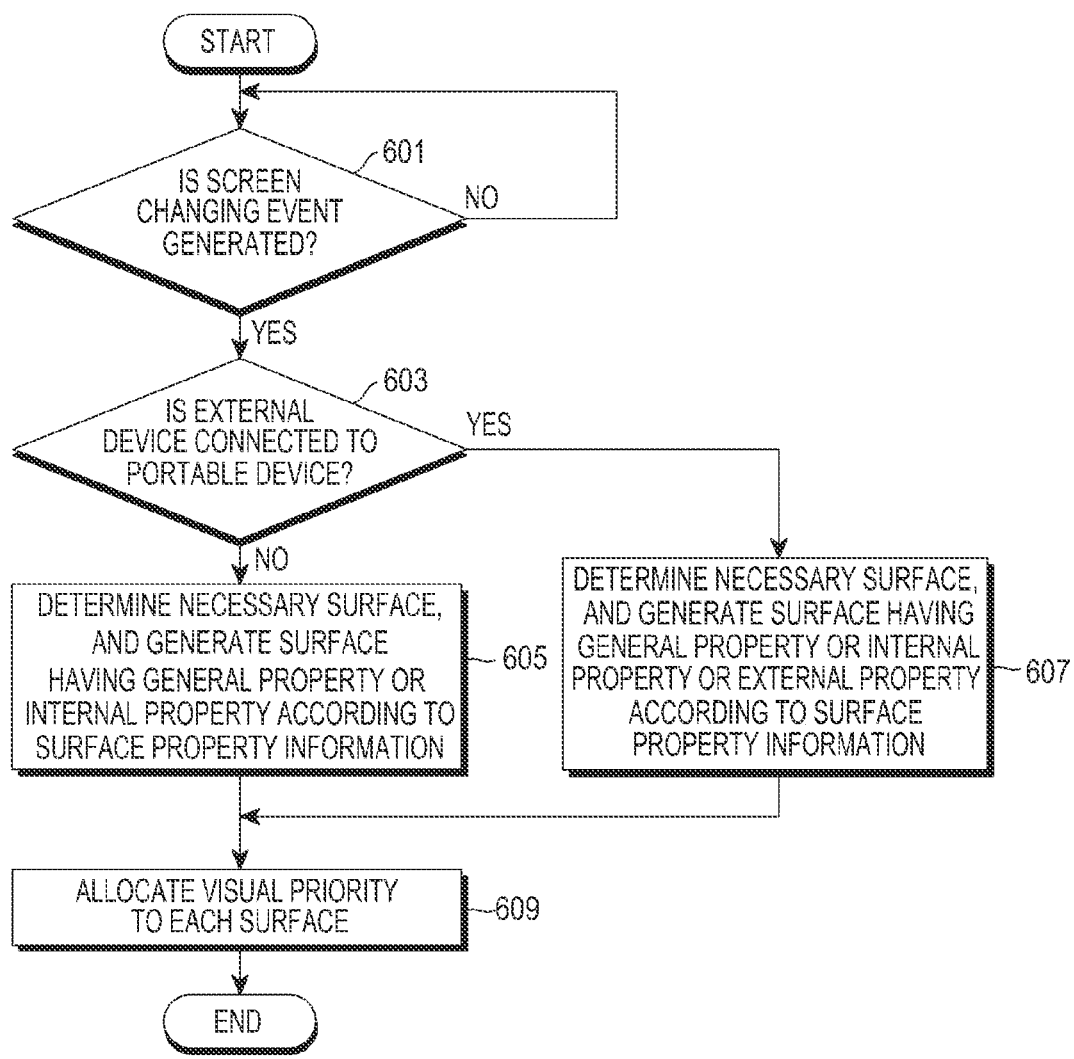

FIG. 10 illustrates a process of determining and generating necessary surfaces according to the present invention. Referring to FIG. 10, the controller 110 determines whether a screen-changing event is generated, in step 601, and proceeds to step 603 if generated. In step 603, the controller 110 determines whether the portable device 100 is connected to the external image output device. The image output device can be connected to the portable device 100 through a connector 165 or a communication scheme supported by the sub-communication module 130.

As a result of the identification in step 603, if the portable device is not connected to the external image output device, the controller 110 identifies data or information to be displayed on a screen in correspondence to the screen-changing event, and determines a surface necessary for a change of the screen according to the result of the identification, in step 605. The controller 110 also allocates a surface property to the determined surface. The surface property indicates which frame of the internal output frame and the external output frame a corresponding surface constitutes. The image-processing unit 180 is controlled to generate a surface having a general property or an internal property according to information on the surface property. For example, among the data or information to be displayed on a screen in correspondence to the screen-changing event, the data or information to be captured and stored is determined to be expressed by the general surface, and the data or information to be excluded is determined to be expressed by the internal surface.

If the portable device is connected to the external image output device, the controller identifies data or information (or information) to be displayed on a screen in correspondence to the screen-changing event, and also identifies data (or information) to be displayed on the external image output device and data (or information) to be displayed on the display unit 190 of the portable device 100, in step 607. As a result of the identification, the controller determines a surface and a surface property that are necessary for the change of the screen. Then, the controller generates a surface that has a general, an internal, or an external property according to the surface property.

In step 609, the controller 110 sets the visual priority to each surface.

Figure 11:
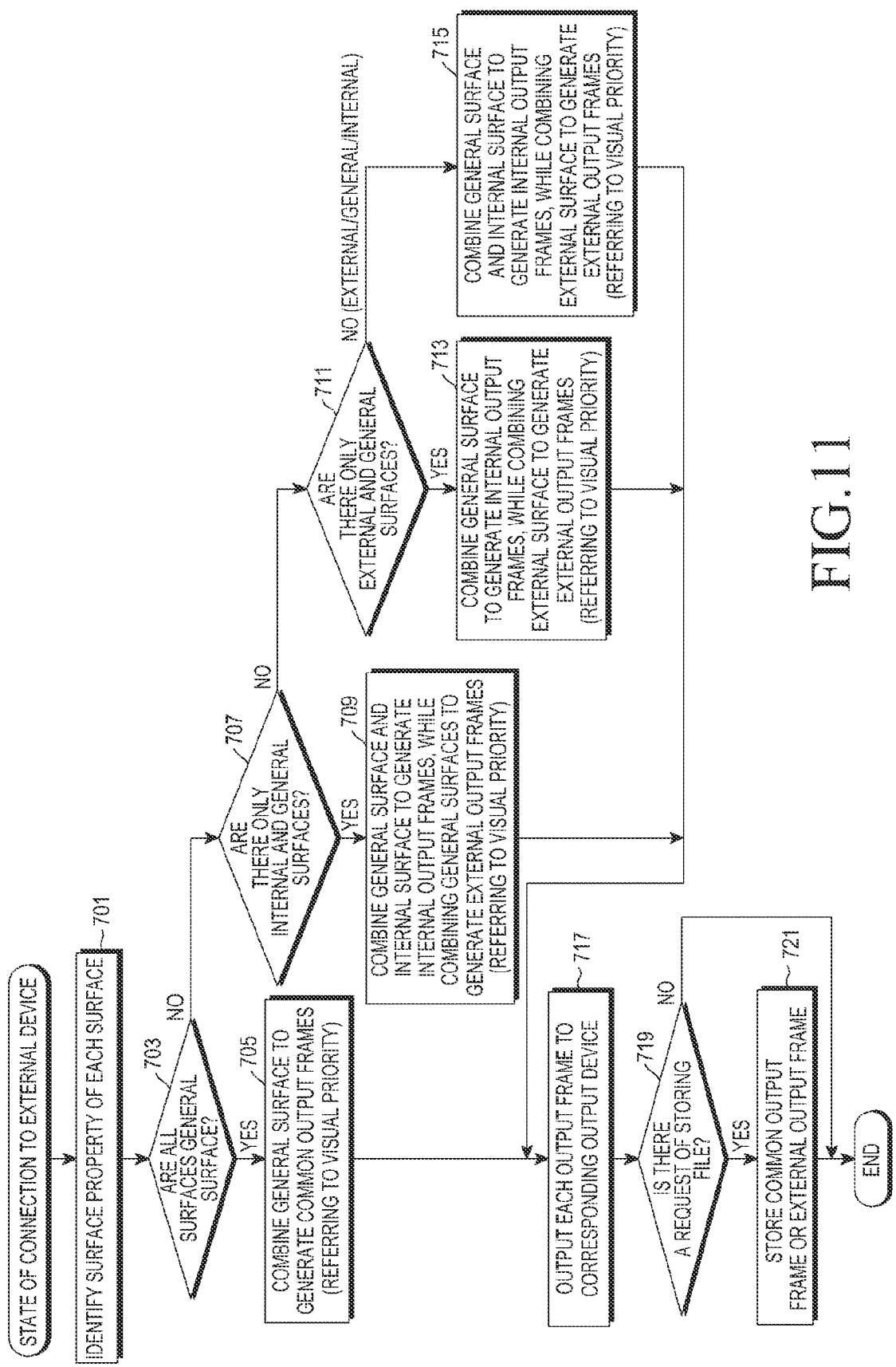

FIG. 11 illustrates a process of combining the surfaces generated through the process illustrated in FIG. 10. In an example of FIG. 11, it is assumed that the portable device 100 is connected to the external image output device and has to transmit the image frames to the external image output device.

Referring to FIG. 11, the image-processing unit 180 identifies the surface property of each surface in step 701. If all surfaces are general surfaces in step 703, the controller combines the general surfaces and generates one output frame in step 705. One generated frame may be used as an internal output frame or an external output frame, and hereinafter is referred to as a common output frame for the purpose of conciseness. In step 717, the image-processing unit 180 outputs the common output frame to the display unit 190 and the external image output device. Accordingly, the portable device 100 and the external image output device display the identical screen.

However, as a result of the identification in steps 701 and 707, if only the internal surface and the external surface are present, the image-processing unit combines the general surface and the internal surface to generate internal output frames, and combines only the general surface to generate external output frames in step 709. In step 717, the image-processing unit 180 outputs the internal output frames to the display unit 190, and outputs the external image frame to the external image output device. Therefore, a different screen is displayed on the portable device 100 and the external image output device.

However, as a result of the identification in steps 701, 707 and 711, if only the external surfaces and the internal surfaces are present, the image-processing unit 180 combines only the general surfaces so as to generate the internal output frames, and combines only the external surfaces so as to generate the external output frames, in step 713. In step 717, the image-processing unit 180 outputs the internal output frames to the display unit 190, and outputs the external image frame to the external image output device. Therefore, a different screen is displayed on the portable device 100 and the external image output device.

However, as a result of the identification in steps 701, 707 and 711, if all the external surfaces, the internal surfaces and the general surfaces are present, the image-processing unit 180 combines the general surfaces and the internal surfaces so as to generate the internal output frames, and combines the external surfaces so as to generate the external output frames, in step 715. In step 717, the image-processing unit 180 outputs the internal output frames to the display unit 190, and outputs the external image frames to the external image output device. Therefore, a different screen is displayed on the portable device 100 and the external image output device.

In steps 705, 709, 713 and 715, output image frames are generated with reference to the visual priority.

If a screen capture is requested in step 719, the image-processing unit 180 stores the common output frames or the external output frames in the storage unit 175. Accordingly, when the image frames are stored through the screen capture, the data (or information) to be excluded is included in the internal surface while the data (or information) to be stored is included in the general surface or the external surface.

Figure 12:
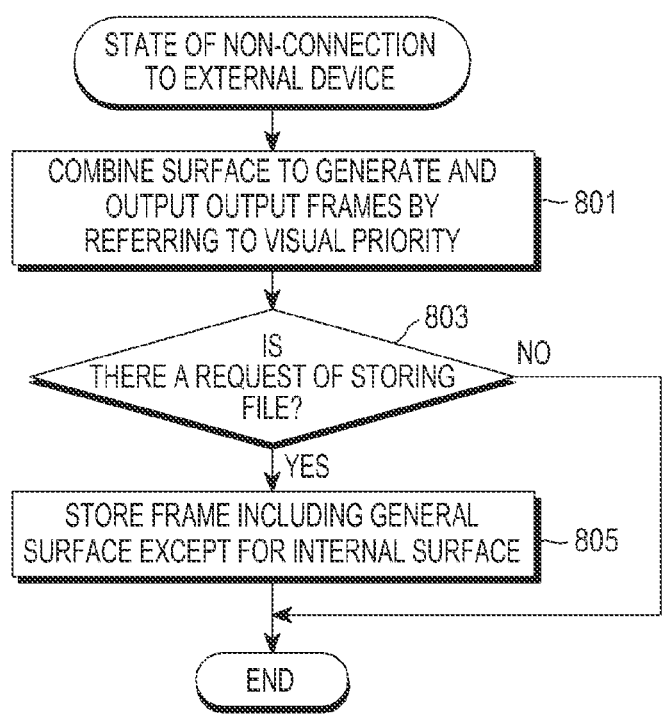

FIG. 12 illustrates a process of combining the surfaces generated through the process illustrated in FIG. 10 when the portable device 100 is not connected to the external image output device. Referring to FIG. 12, the image-processing unit 180 combines the surfaces by referring to the visual priority so as to generate the output frames, and outputs the output frames. If a request is made to store a file in step 803, the image frames including the general surfaces except for the internal surfaces are stored in the storage unit 175 in step 805. That is, when the image frames are stored through the screen capture, the data (or information) is included in the internal surfaces.

Figure 13:
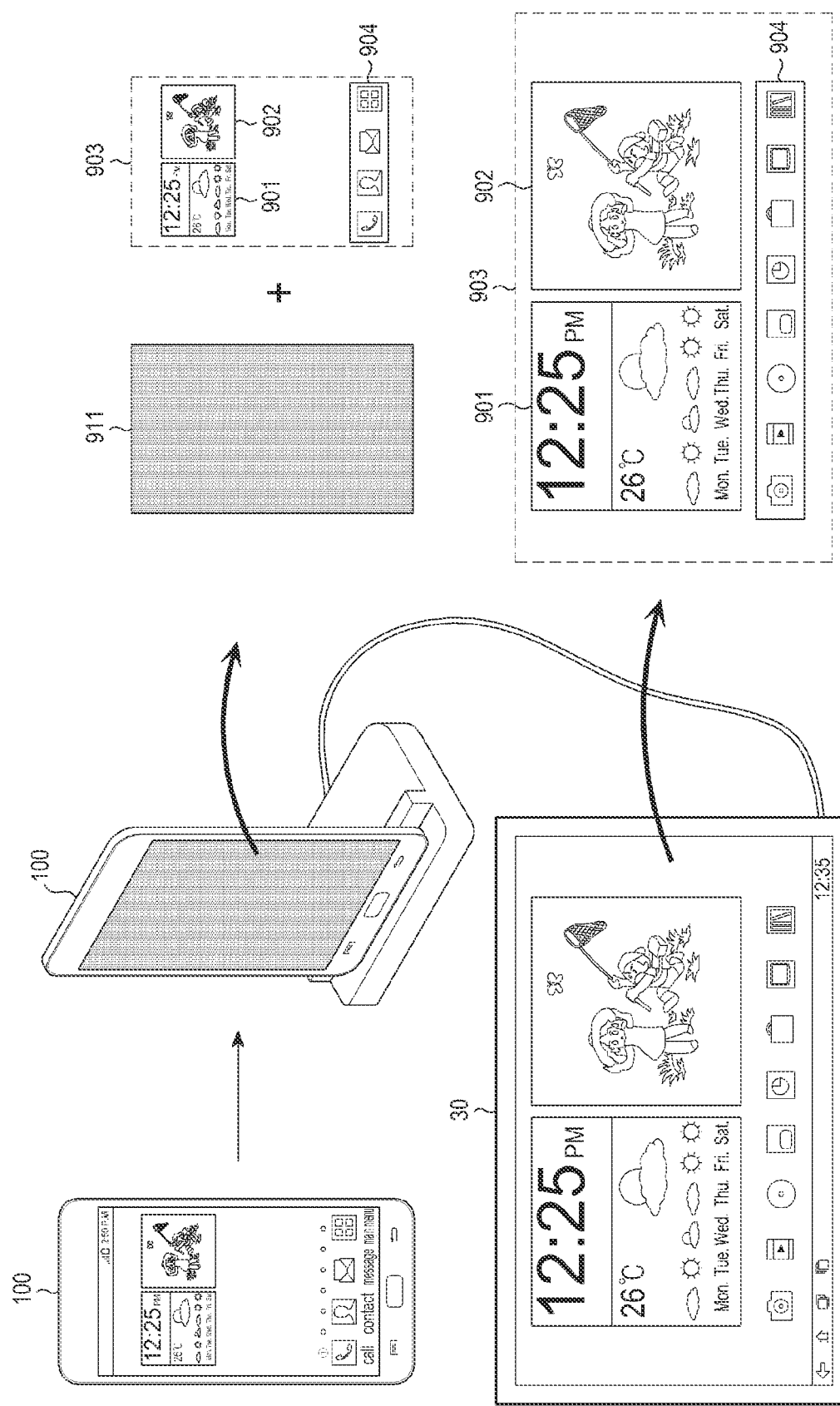
FIGS. 13, 15 and 16 illustrate an example of displaying a screen according to the embodiment of the present invention.
Figure 14:
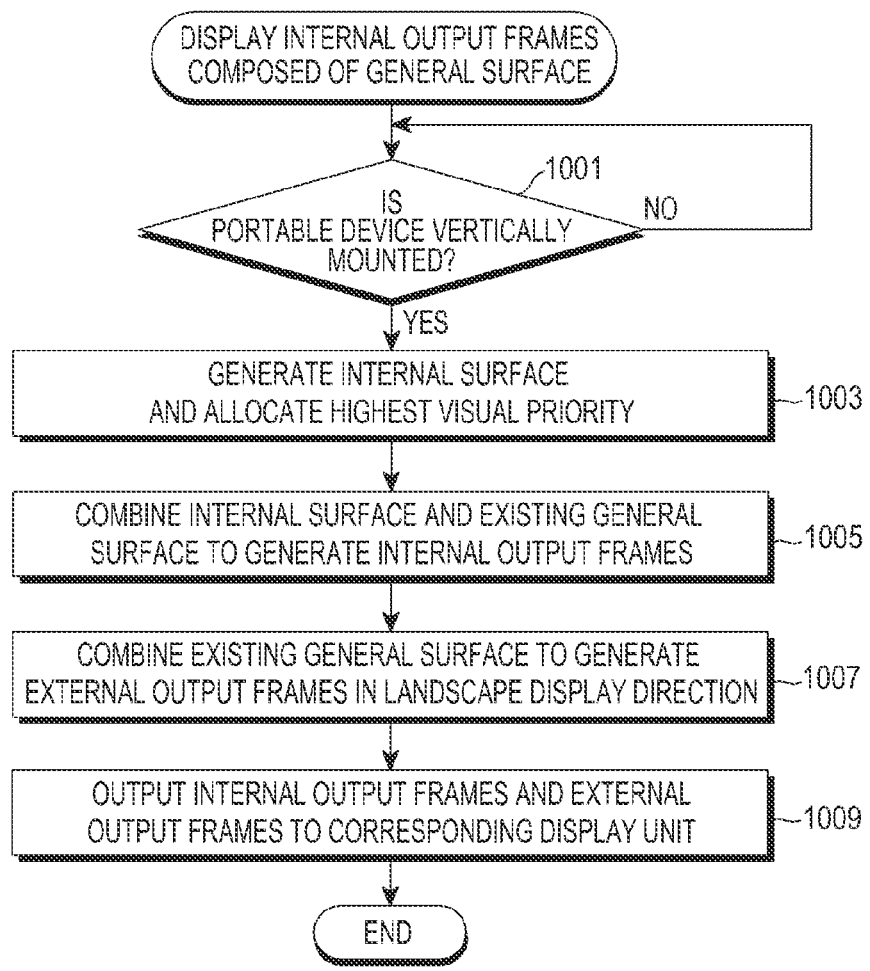

FIG. 13 illustrates a change of the screen as the portable device 100 is connected to an IP television 30 through the docking station 40 when the portable device 100 displays the internal output frames that are composed of the general surfaces. It is assumed that the portable device 100 is vertically mounted on the docking station 40, the screen to be displayed on the portable device 100 is output through the IP television 30 after the portable device 100 is connected to the docking station 40, and the portable device 100 displays a blank screen. FIG. 14 illustrates an operating process of the portable device 100 according to the embodiment of FIG. 13.

In FIG. 13, the portable device 100 displays the image frames including four general surfaces 901, 902, 903 and 904 before mounted on the docking station 40.

As the portable device 100 is mounted on the docking station 40 connected to the IP television 30, the controller 110 of the portable device 100 determines whether a screen-changing event is generated in step 1001, and also determines whether the portable device 100 is vertically mounted on the docking station 40, as shown in FIG. 14. Accordingly, the portable device 100 proceeds to step 1003, and determines a surface necessary for an output of a suitable screen.

In the embodiment in FIG. 13, if it is assumed that the screen to be displayed on the portable device 100 is output through the IP television 30 after the portable device 100 is connected to the docking station 40 so that the portable device 100 displays the blank screen, the controller 110 maintains the surface constituting the existing image frames itself while determining that an internal surface is necessary in order to display the blank screen. Accordingly, the controller 110 controls the image-processing unit 180 to generate an internal surface 911 which can display the blank screen, and to allocate the highest visual priority to the internal surface 911, in order to display the blank screen.

The controller 110 instructs the image-processing unit 180 so that the external output frame is generated in a horizontal display direction. Although the portable device 100 is vertically mounted on the docking station 40, it is preferred that the image frames output to the IP television 30 are constructed in a horizontal display direction because the IP television 30 is a landscape-type device. Therefore, when it is detected that the portable device 100 is vertically mounted on the docking station 40, a value of a setting that the external output frame is generated in a landscape display direction may be previously stored in the portable device 100.

In step 1005, the image-processing unit 180 combines the internal surface 911 and the existing general surfaces 901, 902, 903 and 904 so as to generate the internal frame. Since the internal surface 911 has the highest visual priority, the existing general surfaces 901, 902, 903 and 904 are covered with the internal surface 911. As a result, the portable device 100 displays a blank screen.

In step 1007, the image-processing unit 180 combines the existing general surfaces 901, 902, 903 and 904 so as to generate the external frame in a landscape display direction.

In step 1009, the image-processing unit 180 outputs the internal output frame to the display unit 190 of the portable device 100, and transmits the external output frame to the docking station 40.

According to the process as described above, when the portable device 100 is mounted on the docking station 40 connected to the IP television 30, a screen displayed on the portable device 100 before the portable device 100 is connected to the docking station 40 is output through the IP television 30, while the portable device 100 displays a blank screen, as shown in FIG. 13.

In the embodiment of FIG. 13, it has been assumed that the portable device 100 outputs the blank screen. However, in another embodiment, it is possible to constitute the internal surface 911 so that information indicating a description of the image data to be output to the IP television 30 can be displayed on the portable device 100.

Alternatively, although the portable device 100 displays the blank surface, the portable device 100 may generate the external output frames so that a portrait image itself can be displayed on the IP television connected the docking station 40.

In the embodiment of FIG. 13, since the portable device 100 displays the image frames including only four general surfaces 901, 902, 903 and 904 before it is mounted on the docking station 40, the portable device 100 can maintain the surface property of the existing surface. Alternatively, the general property may be allocated to each surface constituting the image frames that are displayed on the screen of the portable device 100, as the portable device 100 is mounted on the docking station 40.

Figure 15:
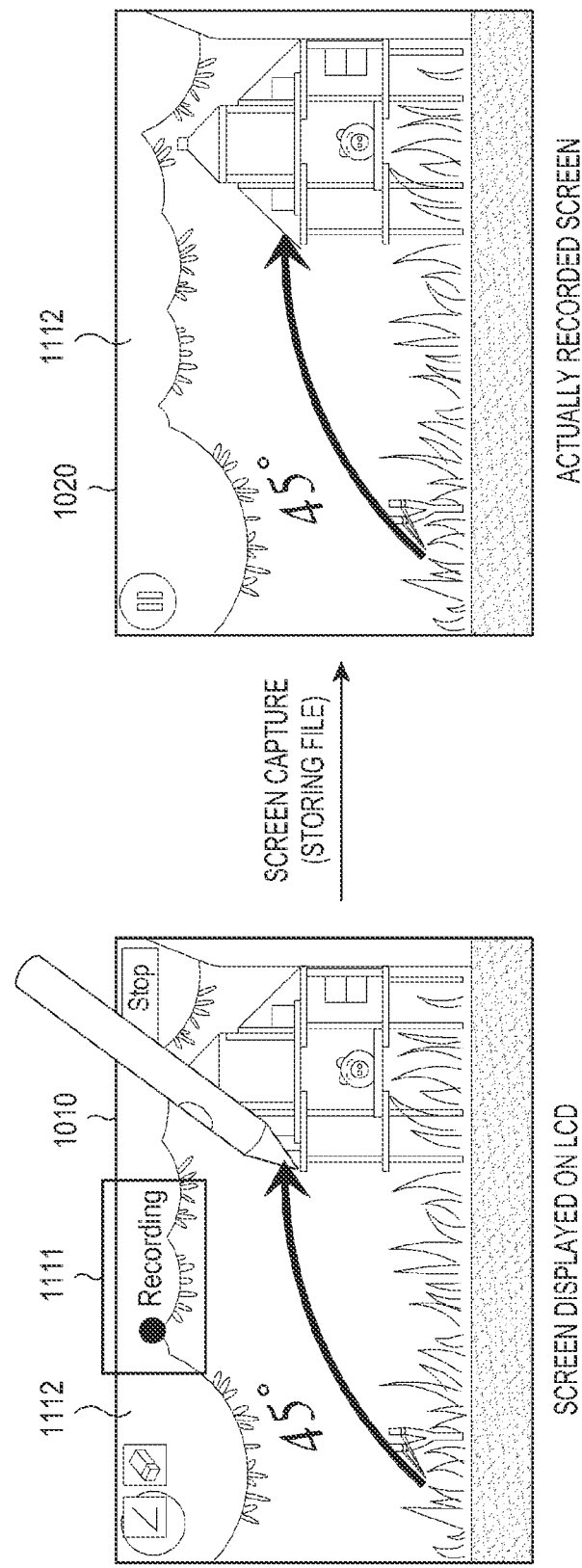

FIG. 15 illustrates an example of capturing and storing of the screen of the portable device 100 according to the present invention. It is assumed that the portable device 100 can output a screen on which a game application is executed, to the display unit 190. It is assumed that all data relating to the execution of the game application are composed of the general surfaces 1112, and other information is composed of the internal surface 1111.

Accordingly, while the portable device 100 outputs the screen relating to the execution of the game application to the display unit 190, it displays information of "recording" which indicates that the screen is captured, on the internal surface 1111 when the portable device 100 is required to store a screen capture file. Accordingly, the image frames in which the internal surface 1111 and the general surface 1112 are combined are provided to an output screen 1010 of the display unit 190. However, the capture file that is actually stored is a recording screen 1020 composed of the general surfaces 1112 except for the internal surfaces 1111.

Figure 16:
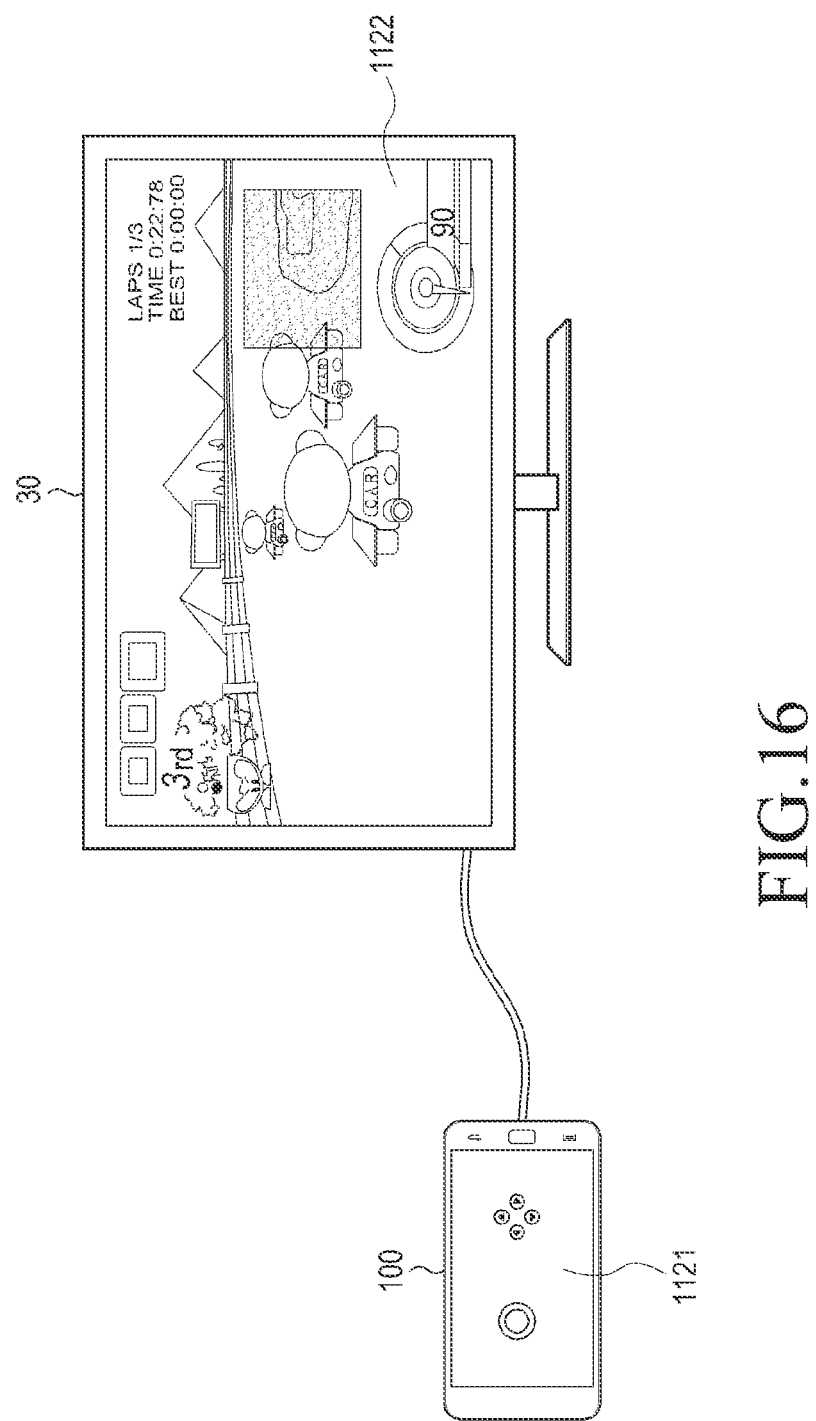

FIG. 16 illustrates an example of screens of the portable device 100 and the IP television 30 when the game application is executed when the portable device 100 is connected to the IP television 30. In the embodiment of FIG. 16, it is assumed that the portable device 100 is used as a control device for controlling the game while the IP television is used as a display unit for displaying screens of the game according to the execution of the game application, when the game application is executed while the portable device 100 is connected to the external IP television 30.

Therefore, the portable device 100 composes the general surfaces of data indicating the User Interface (UI) for a control of the game application, and also composes the external surface of images according to the progress of the game application. Then, the portable device 100 generates the internal output frames 1121 composed of the general surfaces to be displayed through the display unit 190 of the portable device, while generating the external output frames 1122 composed of the external surfaces to be transmitted to the IP television 30.

It will be appreciated that various changes can be performed to the foregoing embodiments without departing from the scope of the present invention. For example, in the embodiment of FIG. 5 to FIG. 16, the surface property is classified into general, internal and external properties. However, in another embodiment of the present invention, the surface property can be classified by using only the internal property and the external property. In this case, the internal surface having the internal property may constitute the internal output frame, and the internal surface having the external property may constitute the external output frame.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of displaying a screen of a portable device having at least one display unit, the method comprising:
   detecting generation of a screen-changing event;
   determining a plurality of layers according to a type of data to be displayed on the screen and whether the portable device is connected to an external image output device, wherein the plurality of layers are determined by classifying the data to be displayed;
   allocating a corresponding layer property indicating an internal output image frame or an external output image frame, to each of the plurality of layers;
   generating the internal output image frame and the external output image frame by combining at least a part of the plurality of layers according to the corresponding layer property of each of the plurality of layers; and
   displaying the internal output image frame on the display unit, and transmitting the external output image frame to the external image output device.

2. The method as claimed in claim 1, wherein the layer property includes an external property indicating an external layer that constitutes the external output image frame, and an internal property indicating an internal layer that constitutes the internal output image frame.

3. The method as claimed in claim 1, wherein the layer property includes an internal property, a general property and an external property.

4. The method as claimed in claim 3, wherein generating the internal output image frame and the external output image frame comprises:
   combining at least one internal layer and at least one general layer to generate the internal output image frame when the plurality of layers only includes the at least one internal layer having the internal property and the at least one general layer having the general property, when the portable device is connected to the external image output device; and
   combining only the at least one general layer to generate the external output image frame.

5. The method as claimed in claim 3, wherein generating the internal output image frame and the external output image frame comprises:
   combining only at least one general layer to generate the internal output image frame when the plurality of layers only includes at least one external layer having the external property and the at least one general layer having the general property, when the portable device is connected to the external image output device; and
   combining only the at least one external layer to generate the external output image frame.

6. The method as claimed in claim 3, wherein generating the internal output image frame and the external output image frame comprises:
   combining only at least one internal layer and at least one general layer to generate the internal output image frame when the plurality of layers includes at least one external layer having the external property, the at least one general layer having the general property and the at least one internal layer having the internal property, when the portable device is connected to the external image output device; and
   combining only the at least one external layer to generate the external output image frame.

7. The method as claimed in claim 4, further comprising storing the external output image frame in a form of a file, when there is a request of capturing and storing the external output image frame.

8. The method as claimed in claim 3, wherein the screen-changing event is generated when the portable device is mounted on a docking station connected to the external image output device, and allocating the corresponding layer property to each of the plurality of layers comprises:
   allocating the general property to a layer which is displayed on the portable device before the portable device is mounted on the docking station; and
   allocating the internal property and a highest visual priority to a layer which displays a blank screen.

9. The method as claimed in claim 8, wherein generating the external output image frame further comprises:
   generating the external output image frame in a landscape display direction when the portable device is vertically mounted on the docking station.

10. A portable device, comprising:
    at least one display unit;
    a controller which detects generation of a screen-changing event, determines a plurality of layers by classifying data displayed on a screen of the display unit according to a type of the data to be displayed on the screen and whether the portable device is connected to an external image output device, and allocates a corresponding layer property indicating an internal output image frame or an external output image frame, to each of the plurality of layers; and
    an image-processing unit which combines at least a part of the plurality of layers according to the corresponding layer property of the plurality of layers to generate the internal output image frame and the external output image frame, displays the internal output image frame on the display unit, and transmits the external output image frame to the external image output device.

11. The portable device as claimed in claim 10, wherein the layer property includes an external property indicating an external layer that constitutes the external output image frame, and an internal property indicating an internal layer that constitutes the internal output image frame.

12. The portable device as claimed in claim 10, wherein the layer property includes an internal property, a general property and an external property.

13. The portable device as claimed in claim 12, wherein the image-processing unit combines at least one internal layer and at least one general layer to generate the internal output image frame, and combines only the at least one general layer to generate the external output image frame, when the plurality of layers only includes the at least one internal layer having the internal property and the at least one general layer having the general property when the portable device is connected to the external image output device.

14. The portable device as claimed in claim 12, wherein the image-processing unit combines only at least one general layer to generate the internal output image frame, and combines only at least one external layer to generate the external output image frame, when the plurality of layers only includes the at least one external layer having the external property and the at least one general layer having the general property when the portable device is connected to the external image output device.

15. The portable device as claimed in claim 12, wherein the image-processing unit only combines at least one general layer and at least one internal layer to generate the internal output image frame, and only combines at least one external layer to generate the external output image frame, when the plurality of layers includes the at least one external layer having the external property, the at least one general layer having the general property, and the at least one internal layer having the internal property when the portable device is connected to the external image output device.

16. The portable device as claimed in claim 13, wherein the external output image frame is stored in a form of a file, when there is a request of capturing and storing the external output image frame.

17. The portable device as claimed in claim 13, wherein the controller detects a generation of the screen-changing event when the portable device is mounted on a docking station connected to the external image output device, allocates the corresponding layer property to each of the plurality of layers which is displayed on the portable device before the portable device is mounted on the docking station, and allocates the internal property and a highest visual priority to a layer for displaying a blank screen.

18. The portable device as claimed in claim 17, wherein the image-processing unit generates the external output image frame in a landscape display direction, when the portable device is vertically mounted on the docking station.

* * * * *